(12) United States Patent
Connor et al.

(10) Patent No.: US 7,247,183 B2
(45) Date of Patent: Jul. 24, 2007

(54) PANEL FILTER WITH GASKET SEAL

(75) Inventors: Michael J. Connor, Stoughton, WI (US); Michael R. Furseth, Cambridge, WI (US); Michael J. Frame, Madison, WI (US); Paul B. Rear, McFarland, WI (US)

(73) Assignee: FleetGuard, Inc., Nashville, TN (US)

( * ) Notice: Subject to any disclaimer, the term of this patent is extended or adjusted under 35 U.S.C. 154(b) by 225 days.

(21) Appl. No.: 10/952,631

(22) Filed: Sep. 29, 2004

(65) Prior Publication Data

US 2006/0064956 A1    Mar. 30, 2006

(51) Int. Cl.
*B01D 46/00*    (2006.01)

(52) U.S. Cl. .............................. 55/495; 55/502; 55/501; 55/511

(58) Field of Classification Search .............. 55/493, 55/494, 495, 497, 499, 500, 501, 502, 504, 55/505, 507, 508, 510, 511; 210/450, 445, 210/441, 451; 277/590, 591, 593, 600, 607, 277/616, 617, 626, 627, 628, 637, 639, 650, 277/652
See application file for complete search history.

(56) References Cited

U.S. PATENT DOCUMENTS

| 3,296,781 | A |   | 1/1967  | Schumann |
|-----------|---|---|---------|----------|
| 4,418,662 | A |   | 12/1983 | Engler et al. |
| 4,477,092 | A | * | 10/1984 | Bush .......................... 277/626 |
| 4,617,122 | A |   | 10/1986 | Kruse et al. |
| 5,569,311 | A | * | 10/1996 | Oda et al. ...................... 55/502 |
| 5,640,937 | A | * | 6/1997  | Slopsema .................. 55/385.3 |
| 5,679,122 | A |   | 10/1997 | Moll et al. |
| 5,759,217 | A |   | 6/1998  | Joy |
| 5,902,361 | A |   | 5/1999  | Pomplun et al. |
| 5,958,097 | A |   | 9/1999  | Schlor et al. |
| 6,045,598 | A |   | 4/2000  | Fath et al. |
| 6,045,600 | A |   | 4/2000  | Michaelis et al. |
| 6,319,300 | B1 |  | 11/2001 | Chen |
| 6,568,540 | B1 | * | 5/2003  | Holzmann et al. ............ 55/502 |
| 2004/0194441 | A1 | * | 10/2004 | Kirsch ......................... 55/502 |

* cited by examiner

*Primary Examiner*—Duane Smith
*Assistant Examiner*—Robert Clemente
(74) *Attorney, Agent, or Firm*—Andrus, Sceales, Starke & Sawall, LLP; J. Bruce Schelkopf

(57) ABSTRACT

A filter is provided by a panel filter element having a perimeter gasket having sealing planes axially between inlet and outlet axial ends of the panel filter element and having a merge point with the panel filter element axially between the sealing planes.

1 Claim, 2 Drawing Sheets

PANEL FILTER WITH GASKET SEAL

BACKGROUND AND SUMMARY

The invention relates to filters, and more particularly to a gasket sealing combination for sealing a panel filter element in a filter housing.

Filters using a panel filter element having a perimeter gasket for sealing the panel filter element in a housing are known. The present invention provides an improved gasket sealing combination.

DETAILED DESCRIPTION

Figure 1:
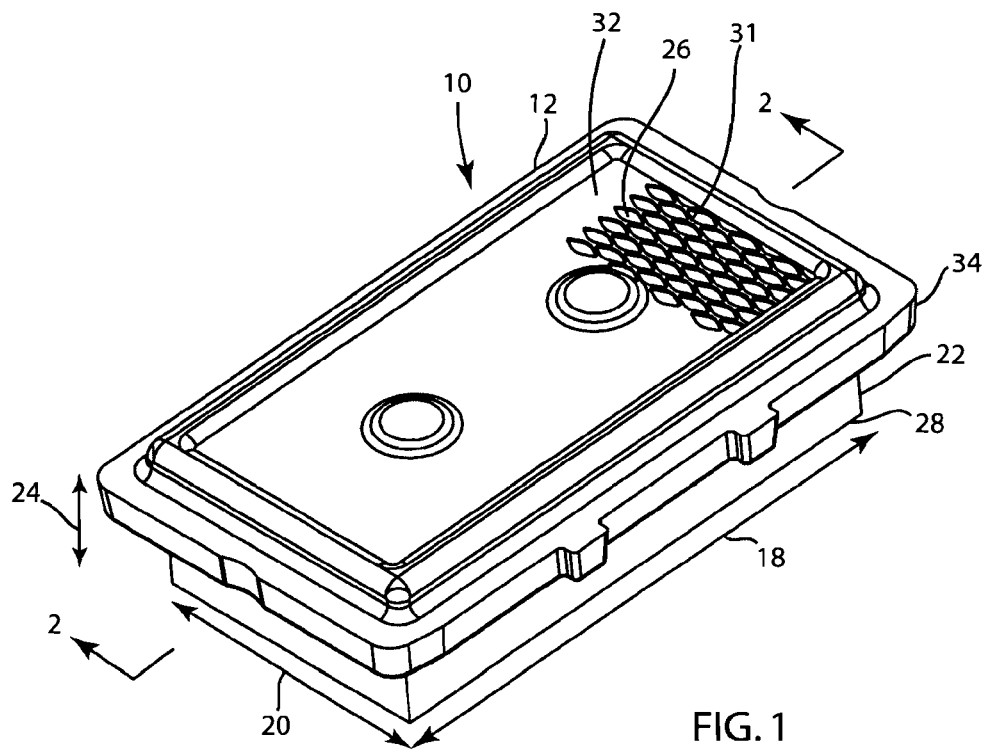
FIG. 1 is a perspective view of a filter constructed in accordance with the invention.
Figure 2:
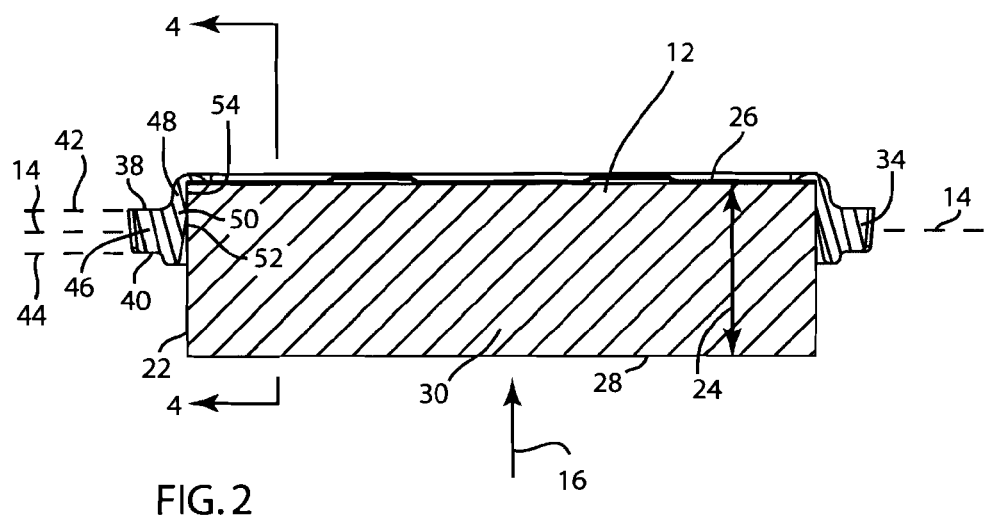
FIG. 2 is a sectional view taken along line 2-2 of FIG. 1.

FIGS. 1 and 2 show a filter 10 provided by a panel filter element 12 lying in a lateral plane 14 and filtering fluid, such as air, gas, or liquid, flowing axially therethrough as shown at arrow 16, transversely to lateral plane 14. Panel filter element 12 has a length 18 and a width 20 defining a perimeter 22 lying in lateral plane 14. Panel filter element 12 has an axial height 24 between an inlet axial end 26 and an outlet axial end 28. The panel filter element may be provided by pleated filter media 30, for example as shown in U.S. Pat. No. 6,568,540, incorporated herein by reference, and/or may be provided by other types of media. The filter element may include an inlet screen or grid 31 and/or an inlet protective or pre-filter layer or scrim 32.

Figure 3:
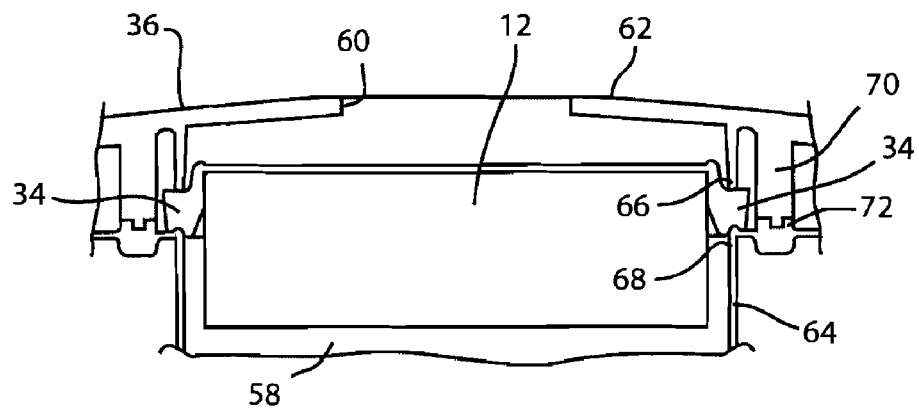
FIG. 3 is a view like FIG. 2 and shows the filter mounted in a housing.

A gasket 34 extends laterally outwardly from perimeter 22 for sealing panel filter element 12 in a housing such as 36, FIG. 3. The gasket is preferably molded to the panel filter element, and is preferably provided by a thermally and chemically resistive material such as polyurethane. Gasket 34 has first and second axially spaced sealing surfaces 38 and 40 facing in opposite axial directions, e.g. upwardly and downwardly, respectively, in FIG. 2, and defining first and second sealing planes 42 and 44, respectively. Gasket 34 has a first portion 46 between sealing surfaces 38 and 40. Gasket 34 has a second portion 48 engaging the panel filter element at perimeter 22. Gasket 34 has a connecting portion 50 extending laterally and axially between portions 46 and 48. Connecting portion 50 merges with portion 48 and engages the panel filter element at an interface merge point 52. In the disclosed construction, both of the following conditions are satisfied in combination: a) both of the sealing planes 42 and 44 are axially between the inlet and outlet axial ends 26 and 28 of the panel filter element; and b) the merge point 52 is axially between the first and second sealing planes 42 and 44.

Figure 4:
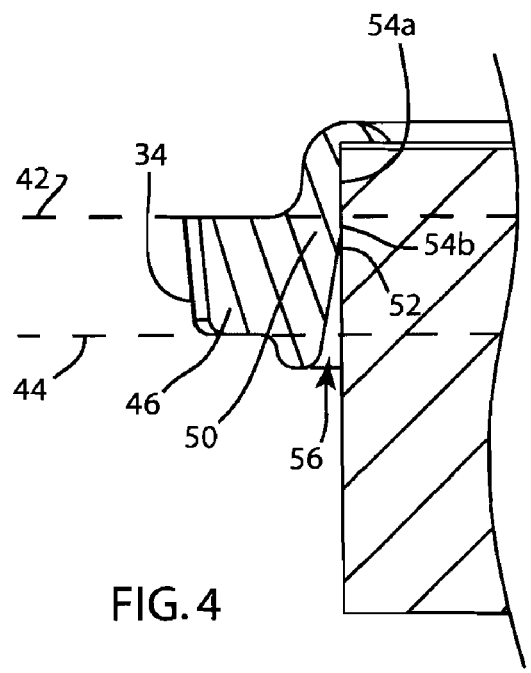
FIG. 4 is an enlarged view of a portion of FIG. 2.

Sealing surface 38 faces axially in a first axial direction (e.g. upwardly in FIG. 2) toward first axial end 26 of panel filter element 12. Second sealing surface 40 faces axially in a second opposite axial direction (e.g. downwardly in FIG. 2) toward second axial end 28 of the panel filter element. First sealing plane 42 is axially between merge point 52 and axial end 26 of the panel filter element. The noted portion 50 of gasket 34 engages the panel filter element along an interface engagement surface 54 spanning axially across sealing plane 42. Engagement surface 54 has a first section 54a, FIG. 4, extending from sealing plane 42 in the noted first axial direction (upwardly in FIGS. 2, 4). Engagement surface 54 has a second section 54b extending from sealing plane 42 in the noted second axial direction (downwardly in FIGS. 2, 4). Second section 54b of engagement surface 54 extends in the noted second axial direction to merge point 52 whereat connecting portion 50 of gasket 34 extends laterally outwardly (leftwardly in FIG. 4) and axially in the noted second axial direction (downwardly in FIG. 4) to first portion 46 of the gasket and is laterally spaced from the panel filter element by a lateral gap 56 therebetween. The entire lateral gap 56 is axially spaced from sealing plane 42 along the noted second axial direction.

The panel filter element is shown mounted in FIG. 3 in a housing 36 having an inlet at 58 receiving, for example, incoming air, and supplying clean filtered air at housing outlet 60, for example to an internal combustion engine. The housing has upper and lower halves 62 and 64 having respective axially extending ribs 66 and 68 engaging sealing surfaces 38 and 40, respectively, in axial sealing compression. The housing halves are mounted to each other at a respective post 70 and socket receptacle 72. Other types of housing arrangements are within the scope hereof.

It is recognized that various equivalents, alternatives and modifications are possible within the scope of the appended claims.

What is claimed is:

1. A filter comprising a panel filter element lying in a lateral plane and filtering fluid flowing axially therethrough transversely to said plane, said panel filter element having a length and a width defining a perimeter lying in said plane, said panel filter element having an axial height between an inlet axial end and an outlet axial end, a gasket extending laterally outwardly from said perimeter for sealing said panel filter element in a housing, said gasket having first and second axially spaced sealing surfaces facing in opposite axial directions and defining first and second sealing planes, said gasket having a first portion between said first and second sealing surfaces, a second portion engaging said panel filter element at said perimeter, and a connecting portion extending laterally and axially between said first and second portions, said connecting portion merging with said second portion and engaging said panel filter element at an interface merge point, wherein in combination:

a) both of said sealing planes are axially between said inlet and outlet axial ends of said panel filter element; and b) said merge point is axially between said first and second sealing planes, wherein said first sealing surface faces axially in a first axial direction toward a first of said axial ends of said panel filter element, said second sealing surface faces axially in a second opposite axial direction toward the second of said axial ends of said panel filter element, and said first sealing plane is axially between said merge point and said first axial end of said panel filter element, wherein said second portion of said gasket engages said panel filter element along an interface engagement surface spanning axially across said first sealing plane, wherein said engagement surface has a first section extending from said first sealing plane in said first axial direction, and has a second section extending from said first sealing plane in said second axial direction, wherein said second section of said engagement surface extends in said second axial direction to said merge point whereat said connecting portion extends laterally outwardly and axially in said second axial direction to said first portion of said gasket and is laterally spaced from said panel filter element by a lateral gap therebetween, the entire said lateral gap being axially spaced from said first sealing plane along said second axial direction.

* * * * *